(12) United States Patent
Slater et al.

(10) Patent No.: US 7,835,900 B2
(45) Date of Patent: Nov. 16, 2010

(54) EMULATED TAPE-BASED STORAGE MEDIA

(75) Inventors: Alastair Slater, Chepstow (GB); Simon Pelly, Bristol (GB); Matthew Jack Burbridge, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 11/741,086

(22) Filed: Apr. 27, 2007

(65) Prior Publication Data
US 2008/0270106 A1     Oct. 30, 2008

(51) Int. Cl.
*G06F 9/455* (2006.01)
*G06F 13/00* (2006.01)

(52) U.S. Cl. .............................. 703/25; 703/22; 703/2; 369/13.37

(58) Field of Classification Search .................. 703/25, 703/22, 1, 2, 24; 369/13.37
See application file for complete search history.

(56) References Cited

U.S. PATENT DOCUMENTS

2004/0181388 A1 * 9/2004 Yip et al. ...................... 703/25
2004/0190216 A1 * 9/2004 Yip et al. ..................... 361/234
2006/0095657 A1 * 5/2006 Rector et al. ................ 711/111

FOREIGN PATENT DOCUMENTS

WO    2005017686 A2    2/2005
WO    2005033945 A1    4/2005

* cited by examiner

*Primary Examiner*—Thai Phan

(57) ABSTRACT

A controller, system, method and computer program for emulating one or more tape-based storage devices using non-tape based physical data storage media. The controller is adapted to generate a data set for indicating an available capacity of the one or more emulated tape-based storage devices, the data set includes capacity data for indicating a respective available capacity of the one or more emulated tape-based storage devices based on an available capacity of the non-tape-based physical data storage media. The controller is also adapted to provide access to data stored on the non-tape based physical data storage medium using tape-based media command and the data set, and to dynamically update the capacity data of the data set in response to a change in the available capacity of the non-tape-based physical data storage media.

14 Claims, 6 Drawing Sheets

EMULATED TAPE-BASED STORAGE MEDIA

FIELD OF THE INVENTION

This invention relates to data storage, and more particularly to emulated tape-based media and a system, method and a computer program product for emulating a tape-based storage system to provide data storage.

BACKGROUND

Tape-based storage devices are typically used for archival storage of data stored on hard drives and for reading and writing data stored on a magnetic tape. Tape drives are sequential-access, and must wind past all preceding data to read any one particular piece of data.

Innovation in disk-based storage technology has reduced the density and cost per bit gap between disk and tape. Furthermore, the performance of a tape device cannot be guaranteed if the tape is dropped or is exposed to non-ideal environmental conditions.

The idea of emulating a tape storage system has been disclosed in WO 2005/017686 and WO 2005/033945. Using such emulation techniques a conventional tape library back-up system can be provided using disk arrays to replace tape cartridges as the physical back-up storage media. Physical tape-based media that would be present in a conventional tape library are replaced by what is termed herein as "virtual tapes." A virtual tape library (VTL) therefore refers to an emulated tape-based library.

In a virtual tape device, capacity may be used on an 'over-committed' basis. For example, a VTL may provide four virtual tape devices emulating second-generation Linear Tape-Open (LTO) media (known in the art as LTO-2 tape devices), whilst only having a disk capacity of 750 Gigabytes (GB). The actual recording capacity of four physical LTO-2 tape devices is 800 GB. In other words, the four emulated LTO-2 tape devices may appear to have a combined nominal capacity of 800 GB although the actual combined available capacity of the four emulated LTO-2 tape devices is only 750 GB. Thus, the amount of available disk space may run out before all of the virtual tape devices fill up.

Also, consider the example of four applications writing data continuously to a VTL of four LTO-2 tapes emulated on a disk-based system having a capacity of 750 GB. If writing to the virtual tapes simultaneously from empty, each of the virtual tapes will ideally attain 187.5 GB (750÷4) capacity.

However, now consider the same VTL having been written to by a single application from empty. In such a situation, there is sufficient disk-space available for the application to fill a first virtual LTO-2 tape with 200 GB of data. Having filled a first virtual LTO-2 tape with 200 GB of data, three further applications writing to the three remaining virtual tapes of the VTL should see virtual tapes having 183.3 GB ((750−200)÷3) capacity.

At present, emulated tape storage systems do not facilitate dynamic handling of changes in available disk capacity to maximize effectiveness of data storage in overcommitted systems.

BRIEF DESCRIPTION OF THE DRAWINGS

For a better understanding of the invention, embodiments will now be described, purely by way of example, with reference to the accompanying drawings, in which.

DETAILED DESCRIPTION

Figure 1:
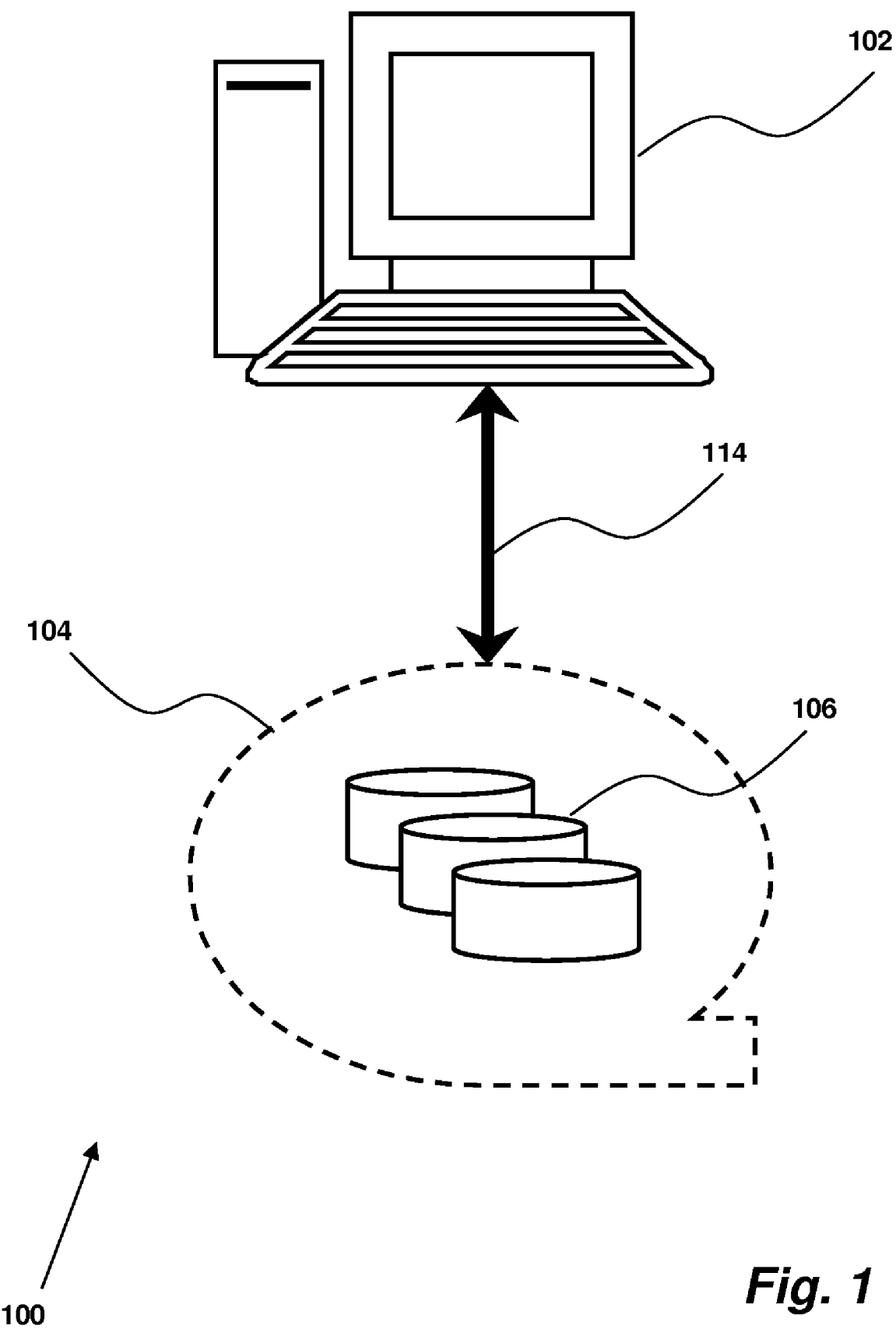
FIG. 1 shows a storage system according to an embodiment of the invention is illustrated.

While the present invention is susceptible of embodiment in various forms, there are described and shown in the drawings presently preferred embodiments. These embodiments are provided so that this disclosure will be thorough and complete, and will fully convey the scope of the invention to those skilled in the art. Like reference numerals refer to like elements throughout.

Referring to FIG. 1, a storage system according to an embodiment of the invention is illustrated. The storage system 100 comprises a computer 102 interfaced, via a connection 114, to hardware/software that emulates tape-based media 104 using disk-based media 106. The hardware/software is arranged to emulate the tape-based media 104 such that a back-up/restore application running on the host computer 102 sees, via the interface connection 114, the same view of the disk-based media 106 as with tape-based storage media. The hardware/software is also arranged to translate linear, sequential, tape format data into data that is suitable for storage on the disk-based media 106.

The computer 102 may take the form of a single chip controller, and the disc storage utilized may not be local to the controller, for example provided over a network.

The disk-based storage media 106 may be, for example, one or more disk arrays. The disk-based storage media 106 provide the actual storage space for backed-up data from the host computer 102. In a preferred embodiment, the disk-based storage media 106 includes a plurality of disks. Such disks are Commercial-Off-The-Shelf (COTS) products and may be relatively inexpensive compared to conventional storage array products.

Thus, the storage system 100 may include emulated tape-based storage media 104 such as tapes. These "emulated media" 104 are presented to the host computer by the storage system hardware/software such that, from the point of view of the host computer 102, data appears to be backed-up onto physical tape-based media, but is in fact backed-up onto the disk-based storage media 106.

Figure 2:
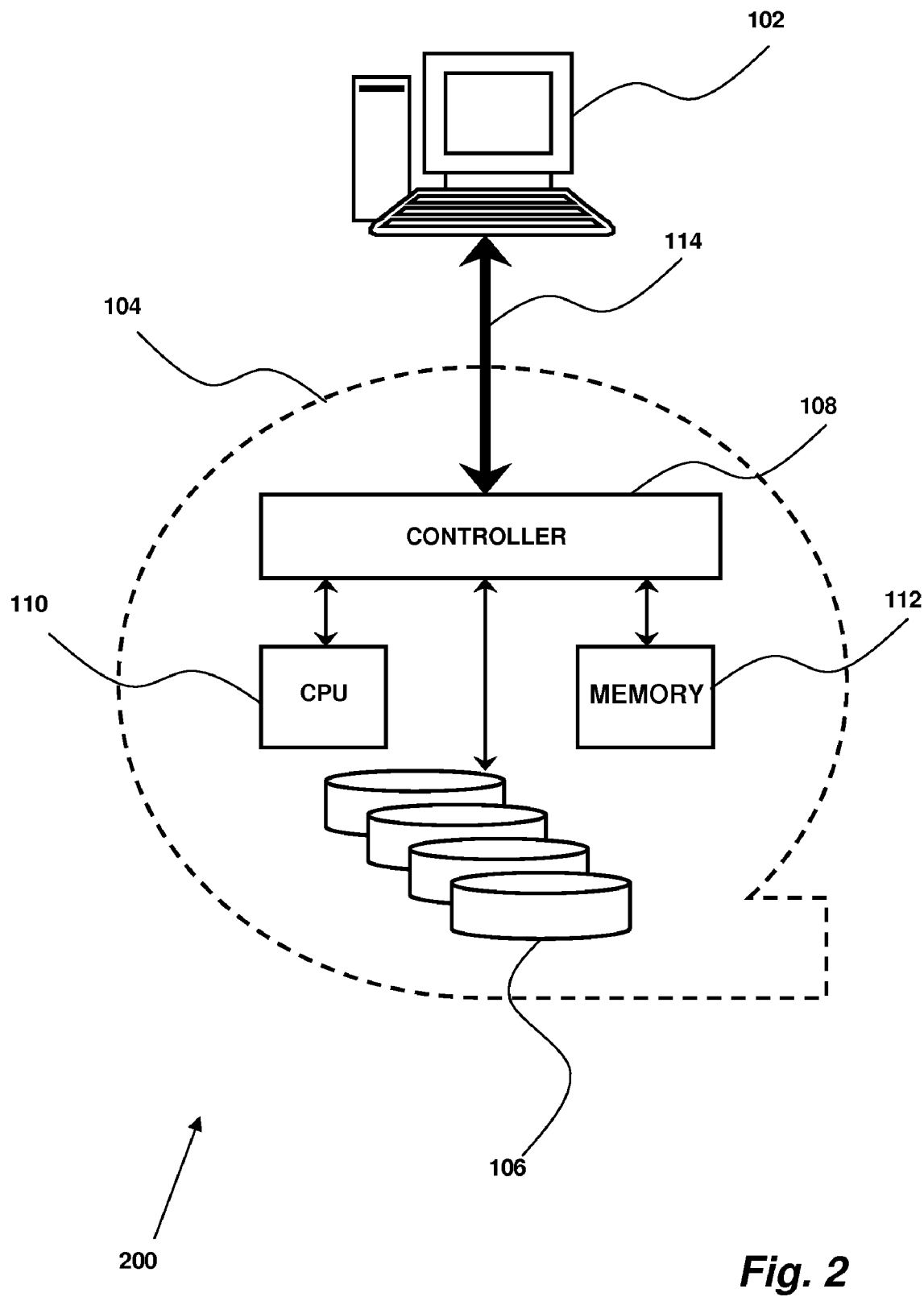
FIG. 2 is a block diagram of a storage system according to an embodiment of the invention.

Referring to FIG. 2, there is illustrated a block diagram of a storage system 200 according to an embodiment of the invention. The storage system 200 includes a storage controller 108 that is connected to the disk-based storage media 106. The storage system controller 108 is also connected to a processor 110 and a memory 112 (such as RAM, ROM, PROM, EEPROM, Flash memory, etc.) which, together, may run all or part of the storage system software. As discussed above, the host computer 102 may then back-up data onto the disk-based storage media 106 via an interface 114 that couples the host computer 102 to the storage controller 108.

Software, including programming code that implements embodiments of the present invention, is typically stored on a computer readable and/or writeable recording medium, and then copied into memory 112 wherein it may be executed by the storage controller 108 and processor 110. Such programming code may be written in any of a plurality of programming languages, for example, Java, Visual Basic, C++, Pascal, or combinations thereof, as the present invention is not limited to a particular programming language.

It is to be appreciated that although the software may be described as being "included" in the storage system 100, and may be executed by the processor 110 or the storage system controller 108, there is no requirement that all the software is executed on either the storage system controller 122 or the processor 108. The software may be on a host computer elsewhere that has access to the same set of disks that are used.

A conventional tape library back-up system can thus be provided using disk arrays to replace tape cartridges as the physical back-up storage media. Physical tape-based media that would be present in a conventional tape library are replaced by what is termed herein as "virtual tapes." For the purposes of this disclosure, the term "virtual tape library" refers to an emulated tape-based library. Such a virtual tape library may be implemented in software and/or physical hardware using one or more disk array(s).

The following discussion will now explain various aspects, features and the operation of the software included in the storage system 200. As discussed above, the flow of data between the host computer 102 and the emulated tape-based media 104 may be controlled by a back-up/restore application.

Figure 3:
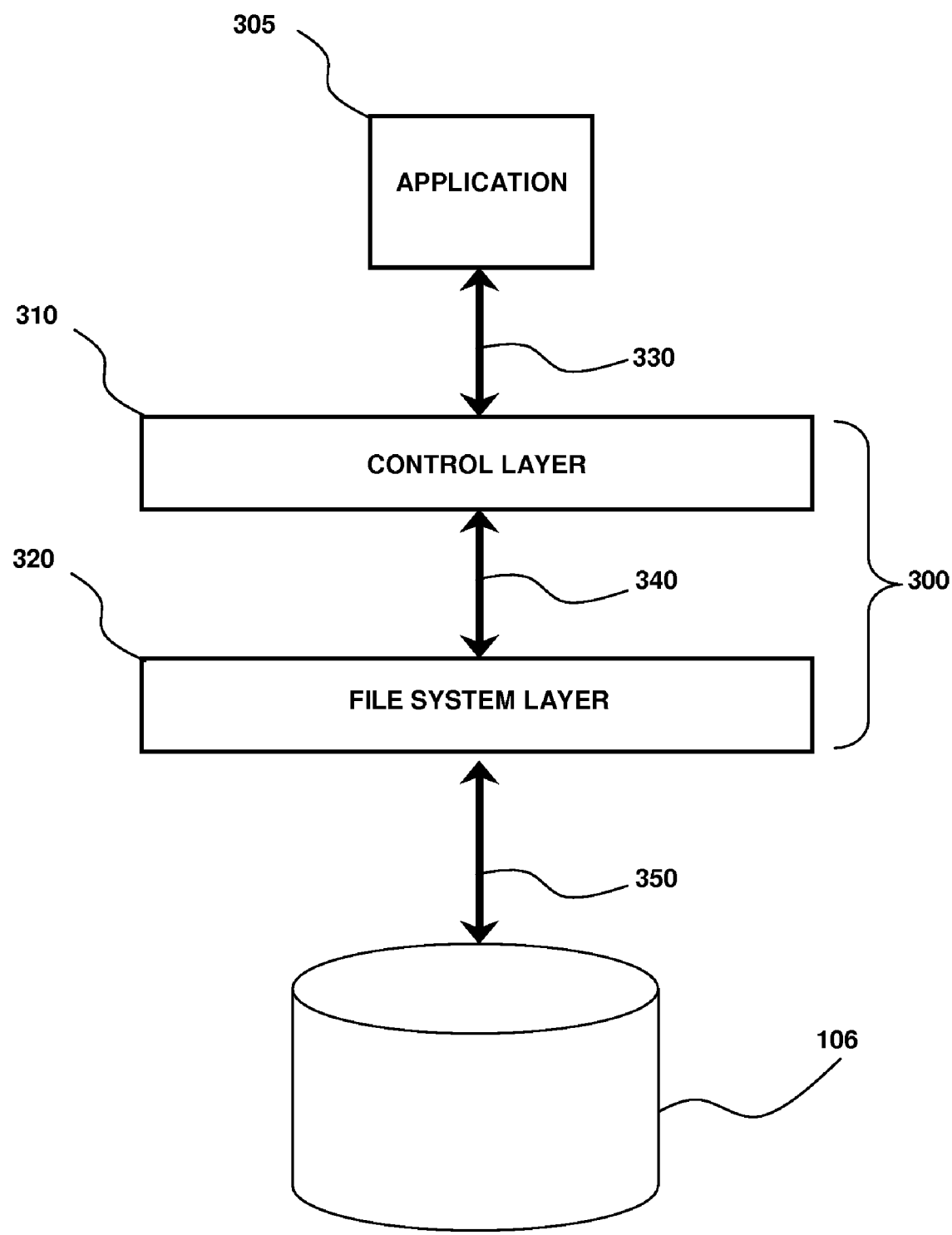
FIG. 3 is a block diagram illustrating the virtual levels of the storage system shown in FIG. 2.

Referring to FIG. 3, a block diagram is shown that illustrates the virtual levels of the storage system shown in FIG. 2. The storage system software, indicated generally by 300, includes logical abstraction layers that represent the emulated tape-based storage media and provide an interface between a back-up/restore application 305 on the computer 102 and the disk-based storage media 106.

The software 300 comprises a first layer 310, referred to hereinafter as the control layer 310, and a second layer 320, referred to hereinafter as the file system layer 320.

The control layer 310 provides a SCSI emulation of tape-based media. The backup/restore application 305 may communicate with the control layer 310 (e.g., to back-up or write data to the emulated tape) using, for example, SCSI commands represented by arrow 330. The control layer 310 therefore provides a software interface between the back-up/restore application 305 and the remaining storage system hardware/software. The emulated tape-based media (represented in the control layer 310) is thereby presented to the back-up applications as conventional tape-based storage media.

The file system layer 320 provides an interface between the emulated tape-based media and the physical disk-based storage media 106. The file system layer 320 provides for communication with the control layer as shown by arrow 340, and with disk-based storage media 106 using, for example, SCSI commands, represented by arrow 350, to read and write data to and from the disk-based storage media 106.

Figure 4A:
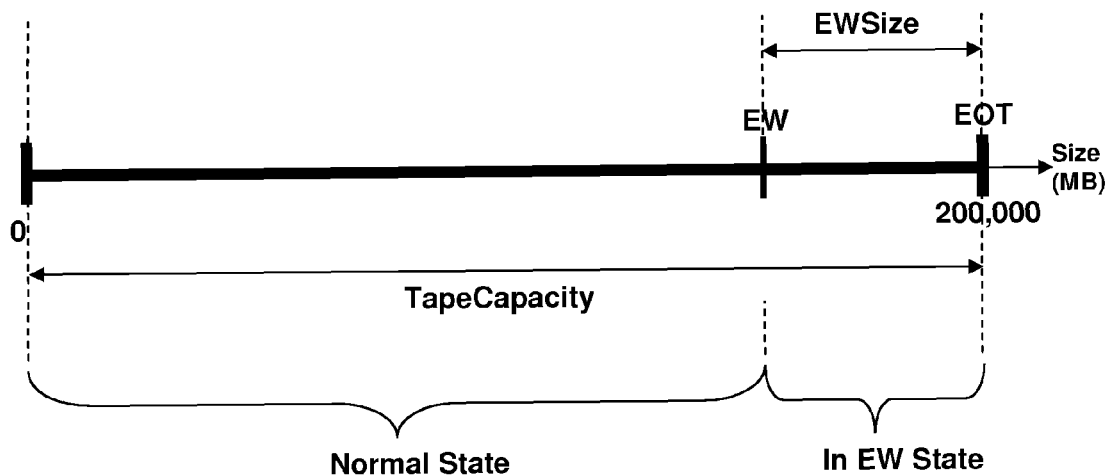
FIG. 4a is a schematic illustration of how data variables may be used to represent the capacity of an empty storage system according to an embodiment of the invention.
Figure 4B:
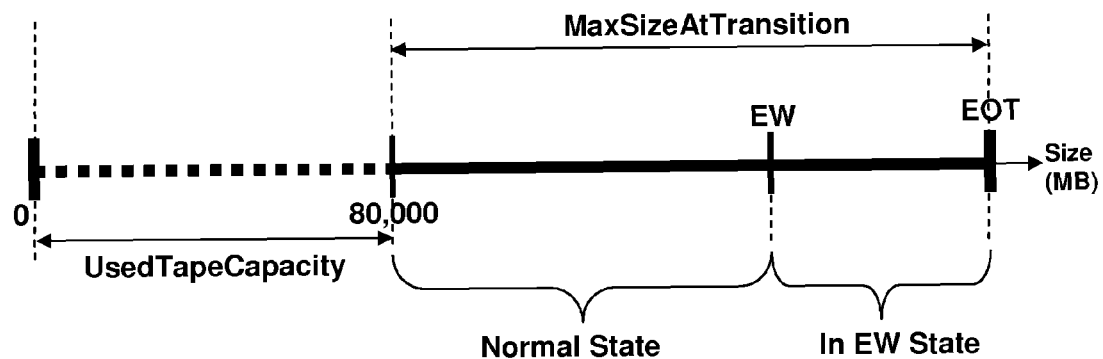
FIG. 4b illustrates how the data variables shown in FIG. 4a may be modified after data is written to the storage system.

FIGS. 4a and 4b illustrate data variables which represent the capacity of a storage system according to an embodiment of the invention. The values of the variables may be stored in the file system layer 320 and used to monitor the free space available in the system by representing capacity information of the emulated tape-based media. Thus, each virtual tape may comprise two data files—a first data file containing information relating to the data variable representing the capacity (used and/or free) of the virtual tape, and a second data file that comprises the actual data written to the virtual tape. For example, a virtual tape that has one hundred records of 64K in size written to it may comprise a file that is 6400K (100×64) in size, which is the written data itself, and a file describing the status and/or data of the virtual tape.

A disk space monitoring process may be run on a periodic basis and used to update the data variables and therefore calculate the total amount of free space that exists in the system. Thus, an available capacity of the emulated tape-based storage can be updated and used to provide an early warning message for indicating when the available capacity is below a predetermined value.

FIG. 4a is a schematic illustration of how data variables may be used to represent the capacity of an empty storage system comprising a single emulated tape-based media device (i.e. a single virtual tape). The bold horizontal line represents the capacity of the virtual tape in Mega-Bytes (MB), with increasing value from left to right. Here, the virtual tape is an LTO-2 tape device, and therefore has a capacity of 200,000 MB (200 GB) and an End of Tape (EOT) marker positioned at the 200 GB position of the virtual tape. Because no data has been written to the virtual tape, the total available capacity (TapeCapacity) of the virtual tape is measured from the start of the virtual tape (0) to the EOT marker. Accordingly, TapeCapacity is equal to the total capacity of an LTO-2 tape device (i.e. 200 GB).

To indicate a region of the virtual tape which is within a fixed distance of the end of the virtual tape, and early warning (EW) marker is defined at a predetermined point of the virtual tape. Accordingly, the EW marker may be used to define an Early Warning End of Media (EWEOM) region, wherein the EWEOM region is the region of the virtual tape between the EW marker and the EOT marker having a size (EWSize) measured in MB.

When an application is writing data to the virtual tape before the EW marker has been reached, the virtual tape may be defined as being in a "Normal State". In a Normal state, the application may write to the virtual tape with little or no risk of running out of available space on the virtual tape.

However, if an amount of data has been written to the virtual tape such that the EW marker has been reached or passed, data will be written in the EWEOM region of the tape and so it may be said to be in an "Early Warning" state. When in an Early Warning state, there is a possibility that the available space on the virtual tape will run out before a data writing process is completed and cause a writing error. Indicating an Early Warning state may therefore be used to inform applications of reduced and/or insufficient storage capacity within the storage system, which can enable the application to avoid unexpected errors or anomalies.

Referring now to FIG. 4b, the illustration shows how data variables may be used to represent the capacity of the storage system of FIG. 4a, wherein data has been written to the virtual tape. More specifically, 80 GB of a data has been written to the virtual tape within FIG. 4b. The amount of space used on the virtual tape is represented by the variable "UsedTapeCapacity" and, accordingly, has a value of 80 GB in this example.

Because the value of UsedTapeCapacity is non-zero (i.e. equal to 80 GB), the available capacity (120 GB) of the virtual tape for any subsequent storage of data is less than the value of TapeCapacity (200 GB). The value of available capacity for subsequent data storage (i.e. at a subsequent write request) is represented by variable "MaxSizeAtTransition" and, in the current example, the value of MaxSizeAtTranstion equals TapeCapacity minus UsedTapeCapacity.

It will be appreciated that, by defining such variables to indicate the available capacity of emulated tape-based media, a system according to the invention can monitor and allocate capacity of the emulated tape-based media. As a result, the invention may enable implementation of an emulated tape storage system using disk-based storage media, wherein the storage capacity of the system can be allocated on an over-committed basis.

When emulating a system with more than one virtual tape, the available capacity of each virtual tape can be monitored and allocated as disk space upon which the data is stored changes.

For example, a VTL may provide two virtual tape devices emulating second-generation Linear Tape-Open (LTO) media (known in the art as LTO-2 tape devices), whilst only having a disk capacity of 300 Gigabytes (GB). An application using the VTL would expect the actual recording capacity of two physical LTO-2 tape devices to be 400 GB. Thus, the amount of available disk space may run out before both of the virtual tape devices fill up.

If two applications were to write data continuously to the two virtual LTO-2 tapes, each of the virtual tapes will ideally attain 150 GB (300÷2) capacity in order to maximize the utilization of available disk space in the system. Thus, before simultaneous data writing to the two virtual tapes is undertaken, the system defines the value of MaxSizeAtTransition for each virtual tape to be equal to 150 GB (the available disk space divided by the number of applications writing to the emulated system simultaneously). Also, since both virtual tapes are empty before the data is written, the EOT marker for each virtual tape is set at a position corresponding to 150 GB of stored data on each tape.

If a value of EWSize has also been defined for each virtual tape, an EW marker for each virtual tape may be set at an appropriate position of each virtual tape so as to define an EWEOM region for each tape. For example, if EWSize equals 2000 MB (2 GB) for both virtual tapes, the EW marker will be set at a position corresponding to 148 GB (EOT−EWSize) of stored data on each virtual tape.

It will therefore be appreciated that, if the two applications subsequently write as much data as possible to each respective virtual tape, an Early Warning state for each virtual tape is entered after 148 GB of data has been written to each (assuming the applications wrote data to each tape at equal speed). Thus, the system indicates when an available capacity of the emulated tape-based media is below a predetermined value whilst also enabling use of the available disk space to be maximized.

The values of the variables may be repeatedly updated so that the available capacity of the emulated tape-based media can be recalculated in order to cater for changes in the amount of disk space available in the system. This may allow the capacity of virtual tapes and respective EW marker positions to be defined dynamically, thereby catering for situations when different applications simultaneously write data to the virtual tapes at different speeds.

A method for checking for an EWEOM indication in a system according to the invention will now be described with reference to FIG. 5. The steps of the method are indicated generally by the arrow labeled "500". The process of checking for an EWEOM indication runs whenever the system receives a data write request, a spacing request or when data is written to the emulated tape-based media of the system. In this way, the system is able to determine whether writing to the virtual tape(s) is valid in terms of available space remaining before the end of the virtual tape(s).

In the first step 510, statistics relating to the capacity of the virtual tapes emulated by the system are obtained. Such statistics include information relating to the remaining space that is available on the disk based storage media of the system. Using the obtained statistics, the values of data variables used to represent the available capacity of the virtual tapes can be defined. The obtained statistics also comprise information relating to whether a new virtual tape has been loaded into the VTL. When a new, empty virtual tape is loaded into the VTL, a Boolean variable (LATCH) associated with the tape is set to a value (LATCH=0) indicating the tape is available it has not entered the EWEOM region.

It is then determined whether a new virtual tape is available which has no data stored on it in step 520. More specifically, the system checks to see if LATCH=0 for the virtual tape and if the current amount of stored data (as represented by the variable "SIZE") on the virtual tape is equal to zero. Thus, each virtual tape in the VTL has its own associated copy of LATCH and SIZE.

When a new, empty virtual tape is loaded into the VTL, LATCH and SIZE will be set to be zero and the method proceeds to step 530. If no new and empty virtual tape is loaded into the VTL, LATCH and SIZE will not be determined to be equal to zero and the method instead proceeds to step 540.

In step 530, the value of available capacity for data storage (MaxSizeAtTransition) in the new and empty virtual tape is set according to the obtained capacity statistics. For example, LATCH may be set to SIZE so as to prevent LATCH being reset if additional storage space becomes available (e.g. because another virtual tape is deleted). Also, if the value of LATCH has been set for a virtual tape, then the total capacity for the virtual tape may be set to MaxSizeAtTransition (i.e. the capacity of the virtual tape is dynamically set downwards in the event of space becoming restricted suddenly.

Therefore, if the capacity of the virtual tapes has been allocated on an overcommitted basis and/or some of the disk space has already been used to store data, the value of MaxSizeAtTransition (the available capacity) for an empty virtual tape may be less than an empty physical tape (as has been explained with reference to FIGS. 4*a* and 4*b*).

The method then proceeds to step 540, in which it is determined whether or not the request to write data or a space to a virtual tape will cause the virtual tape to run out of storage media (i.e. reach or surpass the EOT marker). In doing so, the amount of data to be written, or the size of the space to be written, is represented by the variable "UsedTapeCapacity", and the value of UsedTapeCapacity is compared to the value of MaxSizeAtTransition for the virtual tape. If the value of UsedTapeCapacity is greater than or equal to the value of MaxSizeAtTransition, there is not enough available capacity on the virtual tape to complete the request without the EOT being reached, and the method therefore proceeds to step 550. In step 550, the system returns a state variable value indicating that the EOT marker will be reached, thereby informing the application that there is insufficient capacity available on the virtual tape to complete the data write/space request. The application may then adapt the request accordingly, so as to avoid any write errors, for example.

If, on the other hand value of UsedTapeCapacity is determined to be less than the value of MaxSizeAtTransition, there is enough available capacity on the virtual tape to complete the request without the EOT being reached, and the method therefore proceeds to step 560. In step 560, it is determined whether or not the request to write data or a space a virtual tape will cause the virtual tape to enter the EWEOM region (i.e. reach or surpass the EW marker). In doing so, the value of UsedTapeCapacity is compared to the value of MaxSizeAtTransition for the virtual tape minus the size of an early warning region (EWSize) for the virtual tape.

If the value of UsedTapeCapacity is greater than or equal to the value of MaxSizeAtTransition minus the value of EWSize, there is not enough available capacity on the virtual tape to complete the request without the early warning (EW) marker being reached, and the method therefore proceeds to step 570. In step 570, the system returns a state variable value indicating that the EW marker will be reached or surpassed, thereby informing the application that the particular tape will enter the EWEOM region upon completion of the data write/space request. The application may then adapt the request accordingly, so as to enable finalizing of the written data, for example.

If, on the other hand value of UsedTapeCapacity is determined to be less than the value of MaxSizeAtTransition minus the value of EWSize, there is enough available capacity on the virtual tape to complete the request without the EW marker being reached, and the method proceeds to step 580 accordingly. In step 580, the system returns a state variable value indicating that the EW marker will not be reached, thereby informing the application that the tape will not enter the EWEOM region upon completion of the data write/space request and that the virtual tape will be in a "Normal State". The application may therefore continue to write to the virtual tape with no risk of running out of available space on that virtual tape for that request.

Thus, there has been described a method for checking whether a data write request or space request will cause an emulated tape-based media storage system to enter an EWEOM region on the emulated media and/or run out of available storage space.

A method for checking for available disk space in a system according to the invention will now be described with reference to FIG. 6. The steps of the method are indicated generally by the arrow labeled "600". The process of checking for available disk space may run periodically (for example, every five to ten seconds) as a background process. In this way, up to date capacity data may be obtained and it can be determined whether or not the storage capacity of the system has been reached.

In the first step 610, the process pauses for a predetermined amount of time. The length of the pause may therefore determine how regularly the rest of the process is run. Of course, the predetermined amount of time for a pause need not be fixed at particular value but, instead, may be varied as necessary. After pausing for an amount of time in step 610, the method continues to step 620.

In step 620, it is determined whether or not the disk-based storage media of the system has any remaining storage space available for storing data. In other words, the process checks to see if the disk-based storage media has reached its capacity. If it is determined that the disk-based storage media still has storage capacity available, the method returns to step 610 and the process pauses for a predetermined amount of time before returning to step 620 again.

If, however, it is determined in step 620 that the disk-based storage media has no free space available for storing data, the method proceeds to step 630. In step 630, the value of available capacity for data storage (MaxSizeAtTransition) in the appropriate virtual tape(s) is set to zero in order to indicate that there is no available capacity for storing further data. The method then returns to step 610.

Figure 5:
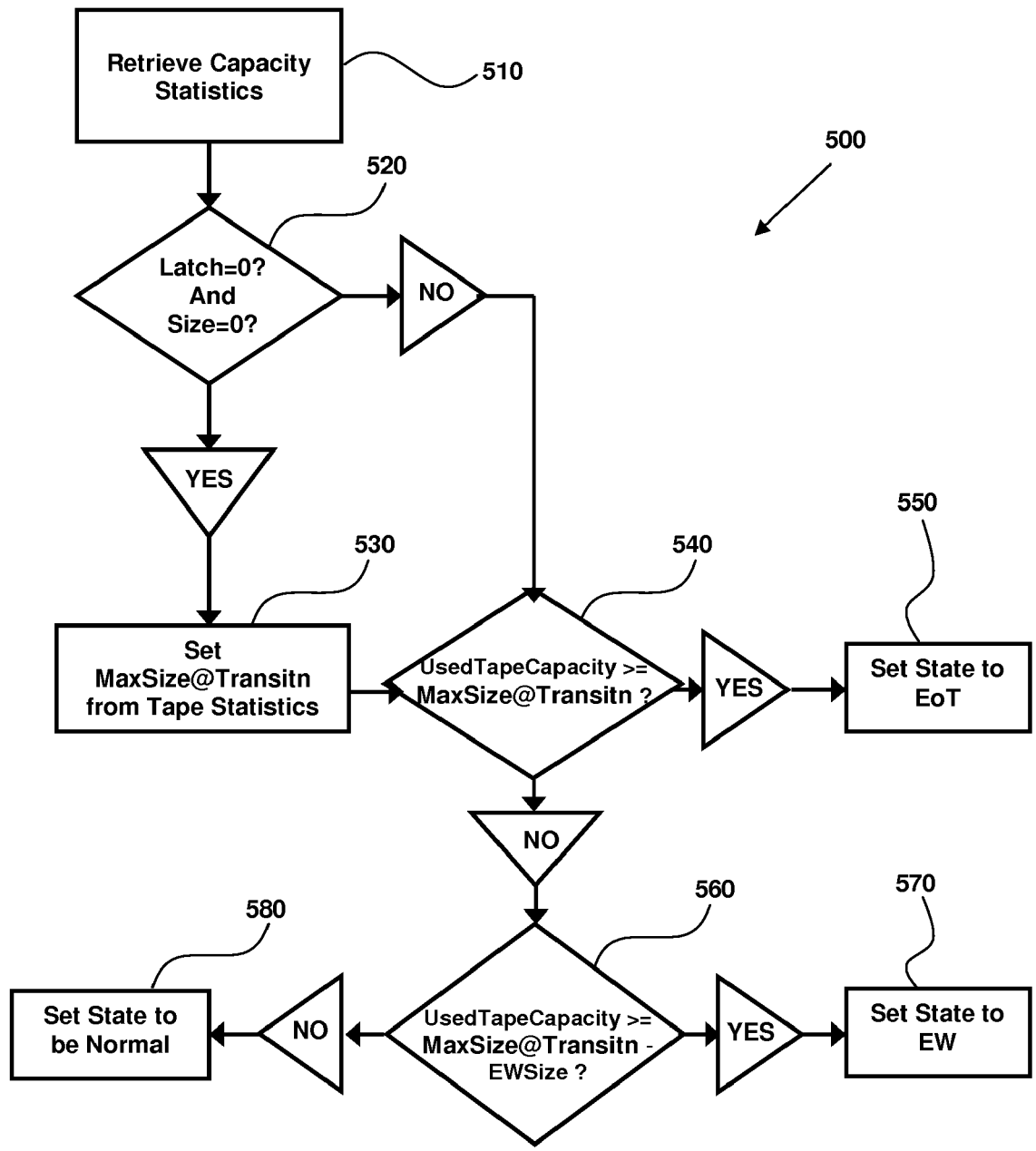
FIG. 5 is a flow diagram of a method of checking for an EWEOM message for the storage system shown in FIG. 2.
Figure 6:
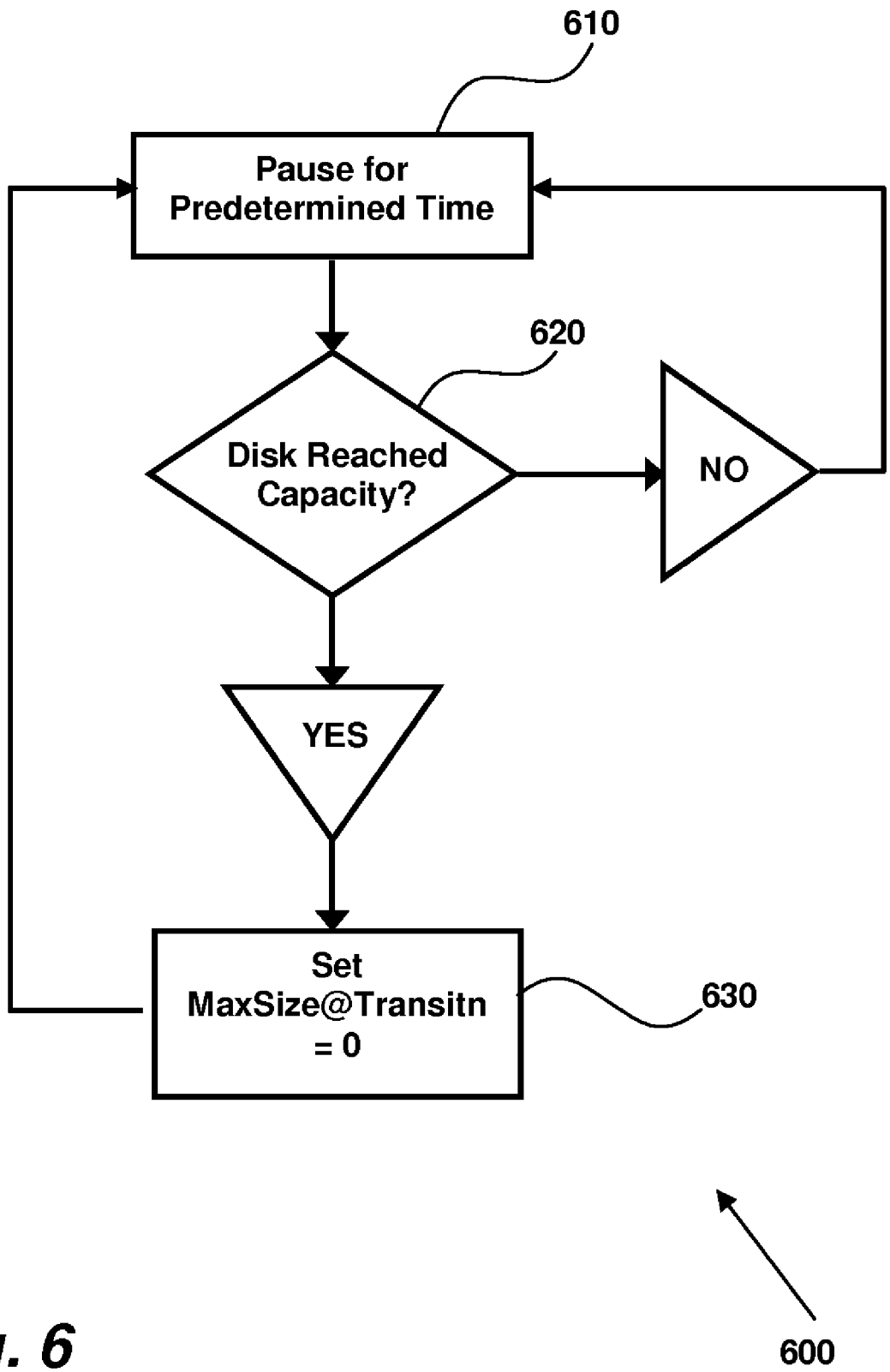
FIG. 6 is a flow diagram of a method of checking for available disk space for the storage system shown in FIG. 2.

It will be understood that a system according to the invention, which employs methods as shown in FIGS. 5 and 6, can indicate whether a data write request or space request will cause the system to enter an EWEOM region on the emulated media and/or run out of available storage space. By periodically assessing the available disk space of the system, the available capacity of the emulated tape-based media can be recalculated in order to cater for changes in the amount of free disk space available. This allows the capacity of the virtual tapes and respective EW marker positions to be defined and/or updated dynamically.

Embodiments therefore facilitate the emulation of a tape storage system using disk-based storage media that allows capacity to be allocated on an overcommitted basis. Such a system may dynamically cater for changes in available disk capacity and maximize the data storage on the emulated tapes. Further, the system may detect and/or indicate when a region near the end of the emulated tape-based media is entered, so as to enable an application to finalise a data writing session without unexpectedly running out of space on the emulated tape-based media.

It should be appreciated that alternative embodiments may be implemented in software, hardware or firmware, or any combination thereof. Thus, for example, embodiments may comprise any computer-readable medium with a computer program embodied on it which, when executed, at least in part, performs the functions of the emulated tape-based storage system.

Embodiments therefore embed the tape emulation functionality into an appliance model, where the virtual tape software maps the tape I/Os onto the disk-based storage media and it remains a 'closed' entity. This addresses the problem associated with backed up images that can then be accessed by users relatively easily, allowing for easy (undesirable) deletion and possible byte editing/corruption.

By enabling the use of disk-based storage media to provide what appears to be a tape-based device to hosts, and in a manner that allows the rapid creation of tape devices on as needed basis, there may be provided savings in the cost and time associated with storing data as existing procedures can be used.

Embodiments may further allow the tape cartridge size to be set dynamically rather than the fixed media size procured when buying actual tape device. The tape cartridge size may also expand and contract dynamically with the size of backup jobs.

Multiple virtual tape cartridges can also be stored on one or more disk-based storage devices. The capacity of such virtual tapes may even be overcommitted so that they appear as a library of virtual tapes having a total storage capacity greater than that available on the one or disk-based storage devices The values of the data variables for indicating capacity statistics of the emulated tape-based media may be stored on the disk-based medium itself, or may be stored elsewhere. However, data variable may be associated with a specific disk and/or virtual tape and modified in response to data which is read from and written to a specific disk and/or virtual tape, as is apparent from the above. The data variables have been described as forming capacity statistics, and these statistics can thus be stored on the disk containing the data or elsewhere within the overall system. References to the data variables being updated thus relate essentially to the updating of the values of the variables forming the capacity statistics.

In the example above, the non-tape-based storage medium is disk-based. However, other (for example future) memory devices may be equally appropriate, for example other random access memory devices.

The system described above provides an interface between a physical storage medium and an emulated tape-based medium. The physical storage medium is described as "nontape-based". Thus, the system interfaces between a first type of physical storage medium and a second, different, emulated type of storage medium in the form of an emulated tape-based medium. The "non-tape-based" medium is preferably a random or pseudo-random access storage medium, and most preferably a disk based medium.

Those skilled in the art will realise that the above embodiments are purely by way of example and that modification and alterations are numerous and may be made while retaining the teachings of the invention.

We claim:

1. A controller for emulating one or more tape-based storage devices having a nominal data capacity using non-tape based physical data storage media, wherein the controller is adapted,
   to generate a data set for indicating an available capacity of the one or more emulated tape-based storage devices, the data set comprising capacity data for indicating a respective available capacity of the one or more emulated tape-based storage devices based on an available capacity of the non-tape-based physical data storage media, and the respective available capacity being different from the nominal data capacity,
   to provide access to data stored on the non-tape based physical data storage medium using tape-based media commands and the data set, and
   to dynamically update the capacity data of the data set in response to a change in the available capacity of the non-tape-based physical data storage media.

2. A controller according to claim 1, wherein the data set further comprises early warning data for indicating when an available capacity of the emulated tape-based media is below a predetermined value.

3. A controller according to claim 1, wherein the data set further comprises used-capacity data indicating an amount of data stored by the emulated tape-based media.

4. A controller according to claim 1, wherein the controller is adapted to generate the capacity data such that the available capacity of the one or more emulated tape-based storage devices is over-committed with respect to the available capacity of the non-tape-based physical data storage media.

5. A method of emulating one or more tape-based storage devices having a nominal capacity using non-tape based physical data storage media, wherein the method comprises the steps of:
   generating a data set for indicating an available capacity of the one or more emulated tape-based storage devices, the data set comprising capacity data for indicating a respective available capacity of the one or more emulated tape-based storage devices based on an available capacity of the non-tape-based physical data storage media, the respective available capacity being different from the nominal data capacity;
   accessing data stored on the non-tape-based physical data storage media using tape-based media commands and the data set; and
   dynamically updating the capacity data of the data set in response to a change in the available capacity of the non-tape-based physical data storage media.

6. A method according to claim 5, further comprising the step of checking for available storage on the non-tape based physical data storage media, wherein the step of checking comprises:
   determining if the non-tape based physical data storage media has any remaining storage space available for storing data;
   and, if no remaining storage space is available, setting the value of a variable to indicate that there is no available capacity for storing further data.

7. A method as claimed in claim 5, further comprising determining the presence of an end of an media early warning indication by determining if writing data to the non-tape based physical data storage medium will cause the respective one or more emulated tape-based storage devices to have an available capacity below a predetermined value.

8. A method according to claim 7, wherein the predetermined value is represented by early warning size data indicating the size of an early warning region of the emulated tape-based media.

9. A method according to claim 7, further comprising the step of:
   if the presence of an end of media early warning indication is found, setting the value of a state variable to indicate that the respective one or more emulated tape-based storage devices will enter an end of media early warning region upon writing the data to the non-tape based physical data storage media.

10. A method according to claim 5, further comprising determining if writing data to the non-tape based physical data storage media will cause one or more of the emulated tape-based storage devices to run out of storage media, by determining if writing data to the non-tape based physical data storage media will cause the respective one or more emulated tape-based storage devices to reach or pass an end of tape marker.

11. A method according to claim 10, further comprising the step of:
   if it is determined that writing data to the non-tape based physical data storage media will cause the respective one or more emulated tape-based storage devices to run out of storage media, setting the value of a state variable to indicate that the emulated tape-based storage device will run out of storage media upon writing the data to the non-tape based physical data storage media.

12. A computer readable medium containing thereon computer program code instructions which, when executed by a computer, cause the computer to perform the steps of:
   generating a data set for indicating an available capacity of one or more emulated tape-based storage devices, the data set comprising capacity data for indicating a respective available capacity of the one or more emulated tape-based storage devices based on an available capacity of a non-tape-based physical data storage media;
   accessing data stored on the non-tape-based physical data storage media using tape-based media commands and the data set; and
   dynamically updating the capacity data of the data set in response to a change in the available capacity of the non-tape-based physical data storage media.

13. A system for emulating tape-based storage media, comprising:
   a controller as claimed in claim 1; and
   non-tape-based physical data storage media for storing the data set.

14. A system according to claim 13, further comprising:
   a processor; and
   a computer readable medium containing thereon computer program code instructions which, when executed by a computer, cause the computer to form the steps of:
   generating a data set for indicating an available capacity of one or more emulated tape-based storage devices, the data set comprising capacity data for indicating a respective available capacity of the one or more emulated tape-based storage devices based on an available capacity of a non-tape-based physical data storage media;

accessing data stored on the non-tape-based physical data storage media using tape-based media commands and the data set; and dynamically updating the capacity data of the data set in response to a change in the available capacity of the non-tape-based physical data storage media.

* * * * *